United States Patent
Kim et al.

(10) Patent No.: US 12,167,285 B2
(45) Date of Patent: Dec. 10, 2024

(54) METHOD AND APPARATUS FOR MANAGING SCELLS DURING A CONDITIONAL PCELL HANDOVER IN A WIRELESS COMMUNICATION SYSTEM

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/620,016

(22) PCT Filed: Jul. 23, 2020

(86) PCT No.: PCT/KR2020/009686
§ 371 (c)(1),
(2) Date: Dec. 16, 2021

(87) PCT Pub. No.: WO2021/015560
PCT Pub. Date: Jan. 28, 2021

(65) Prior Publication Data
US 2022/0248281 A1 Aug. 4, 2022

(30) Foreign Application Priority Data
Jul. 24, 2019 (KR) .................. 10-2019-0089549

(51) Int. Cl.
*H04W 36/00* (2009.01)
*H04W 36/36* (2009.01)
(Continued)

(52) U.S. Cl.
CPC ... *H04W 36/0085* (2018.08); *H04W 36/0069* (2018.08); *H04W 36/36* (2013.01); *H04W 76/15* (2018.02); *H04W 76/34* (2018.02)

(58) Field of Classification Search
CPC ......... H04W 36/0069; H04W 36/0085; H04W 36/36; H04W 76/15; H04W 76/34
See application file for complete search history.

(56) References Cited

U.S. PATENT DOCUMENTS

2016/0112918 A1* 4/2016 Wen .................. H04W 36/0069
455/442
2019/0223057 A1 7/2019 Park et al.
(Continued)

OTHER PUBLICATIONS

Spreadtrum Communications, "NR-U Mobility Consideration", R2-1905683, 3GPP TSG-RAN WG2 Meeting #106, Reno, USA, May 13-17, 2019, pp. 1-3 and figure 1.
(Continued)

*Primary Examiner* — Gary Mu
(74) *Attorney, Agent, or Firm* — BRYAN CAVE LEIGHTON PAISNER LLP

(57) ABSTRACT

A method and apparatus for managing SCells during a conditional PCell handover in a wireless communication system is provided. A wireless device receives, from the source PCell, a handover command including a PCell condition for a target PCell. The handover command includes at least one of Secondary Cell (SCell) conditions for target SCells. A wireless device evaluates the SCell conditions for the target SCells upon determining that the PCell condition for the target PCell is met. A wireless device transmits, to the target PCell, a handover complete message including result of the evaluation of the SCell conditions for the target SCells.

18 Claims, 17 Drawing Sheets

(51) Int. Cl.
*H04W 76/15* (2018.01)
*H04W 76/34* (2018.01)

(56) References Cited

U.S. PATENT DOCUMENTS

| | | | | |
|---|---|---|---|---|
| 2020/0196205 A1* | 6/2020 | Kim | ...................... | H04W 36/36 |
| 2020/0314710 A1* | 10/2020 | Paladugu | .............. | H04W 76/30 |
| 2021/0321313 A1* | 10/2021 | Yan | ........................ | H04W 36/36 |
| 2022/0053388 A1* | 2/2022 | Kim | ................. | H04W 36/0044 |
| 2022/0182903 A1* | 6/2022 | Ishii | ............... | H04W 36/00837 |
| 2022/0256415 A1* | 8/2022 | Höhne | ................. | H04W 36/36 |
| 2022/0295366 A1* | 9/2022 | Teyeb | ................... | H04W 76/30 |
| 2022/0322139 A1* | 10/2022 | Hori | ..................... | H04W 28/06 |

OTHER PUBLICATIONS

Mediatek Inc., "Discussions on NR Conditional Handover Procedures", R2-1906482, 3GPP TSG-RAN WG2 Meeting #106, Reno, NV, USA, May 13-17, 2019 pp. 1-8.

Ericsson, "Triggering of Conditional Handover in NR", R2-1906211, 3GPP TSG RAN WG2 #106, Reno, USA, May 13-17, 2019, pp. 1-6.

Huawei et al., "Considerations on configurations of CHO target cells", R2-1907668, 3GPP TSG-RAN WG2 Meeting #106, Reno, Nevada, USA, May 13-17, 2019, pp. 1-8.

Section 9.2.3.2, "3rd Generation Partnership Project; Technical Specification Group Radio Access Network; NR; NR and NG-RAN Overall Description; Stage 2 (Release 15)", 3GPP TS 38.300 V15.5.0 (Mar. 2019), 97 pages.

* cited by examiner

METHOD AND APPARATUS FOR MANAGING SCELLS DURING A CONDITIONAL PCELL HANDOVER IN A WIRELESS COMMUNICATION SYSTEM

This application is the National Stage filing under 35 U.S.C. 371 of International Application No. PCT/KR2020/009686, filed on Jul. 23, 2020, which claims the benefit of and priority to Korean Application No. 10-2019-0089549, filed on Jul. 24, 2019, the contents of which are all hereby incorporated by reference herein in their entirety.

TECHNICAL FIELD

The present disclosure relates to a method and apparatus for managing SCells during a conditional PCell handover in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In 5th generation (5G) communication system, it is being discussed to introduce conditional mobility. One example of conditional mobility is conditional handover (CHO). The conditional handover is essentially a network-configured but user equipment (UE)-controlled downlink mobility mechanism with a potential to reduce the interruption time and handover failure/radio link failure. The conditional handover improves the handover robustness significantly.

SUMMARY

In a normal handover, a wireless device may perform a handover from a source base station (BS) to a target BS. The source BS may provide, to the target BS, measurement results of the best cell for each frequency, so that the target BS could setup carrier aggregation (CA) and/or dual connectivity (DC) immediately.

For example, the wireless device may receive, from the source BS, handover (HO) command including a SCell configuration for CA and/or DC in response to the measurement results. Then, the wireless device could perform the handover to the target BS, and establish the CA and/or the DC immediately based on the SCell configuration.

However, in a conditional handover, a wireless device may execute the handover from the source BS to the target BS when a condition for the conditional handover is met. In other words, the wireless device may not execute the handover, when the wireless device receives the conditional handover (CHO) command.

Thus, though the source BS provides the measurement results to target BS and the wireless device receives the CHO command including the SCell configuration for a CA and/or a DC from the target BS, the SCell configuration could be outdated when the wireless device actually executes the handover.

Otherwise, the target BS could configure the CA and/or the DC only after receiving the measurement results from the wireless device directly. For example, the target BS may transmit, to the wireless device the SCell configuration for a CA and/or a DC based on the up-to-date measurement results. In this case, the secondary cell (SCell) addition for the CA and/or the DC could be significantly delayed.

Therefore, studies for managing SCells during a conditional PCell handover in a wireless communication system are required.

In an aspect, a method performed by a wireless device in a wireless communication system is provided. The method includes evaluating Secondary Cell (SCell) conditions for target SCells upon determining that a Primary Cell (PCell) condition for a target PCell is met. The method further includes transmitting, to the target PCell, a handover complete message including result of the evaluation of the SCell conditions for the target SCells.

In another aspect, an apparatus for implementing the above method is provided.

The present disclosure can have various advantageous effects.

According to some embodiments of the present disclosure, a wireless device could manage SCell configuration in a conditional handover procedure, efficiently.

For example, a wireless device may report, to the target BS, valid SCells for CA and/or DC operation.

For example, CA and/or DC operation could be started with reported SCells as soon as the target BS receives the handover complete message.

For example, a wireless device may use the SCell configuration included in a conditional handover command, when a condition for the conditional handover is met.

For example, a wireless device may start to establish a SCell addition for CA and/or DC without receiving additional SCell configurations.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

Figure 1:
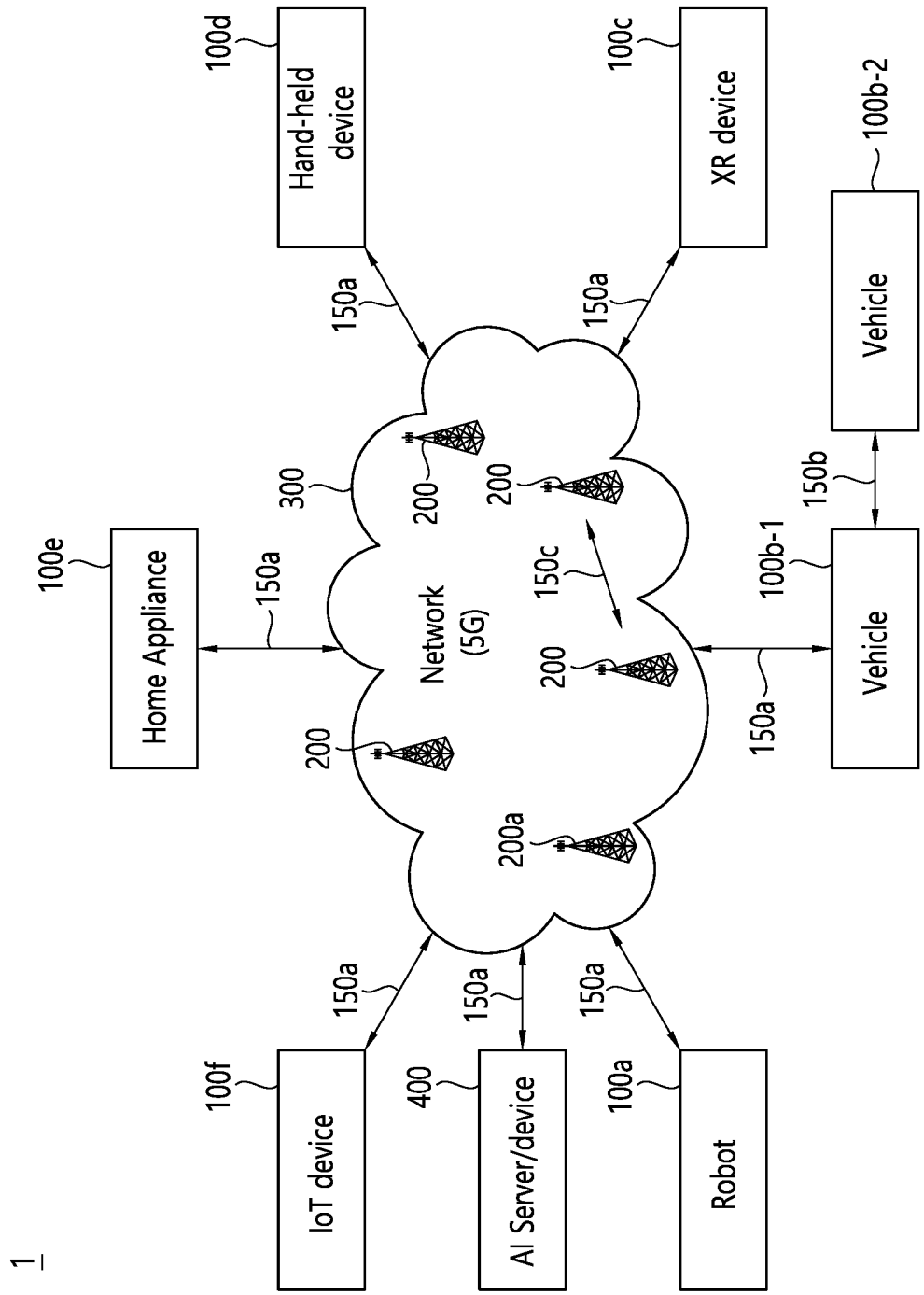
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). O1-DMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs O1-DMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
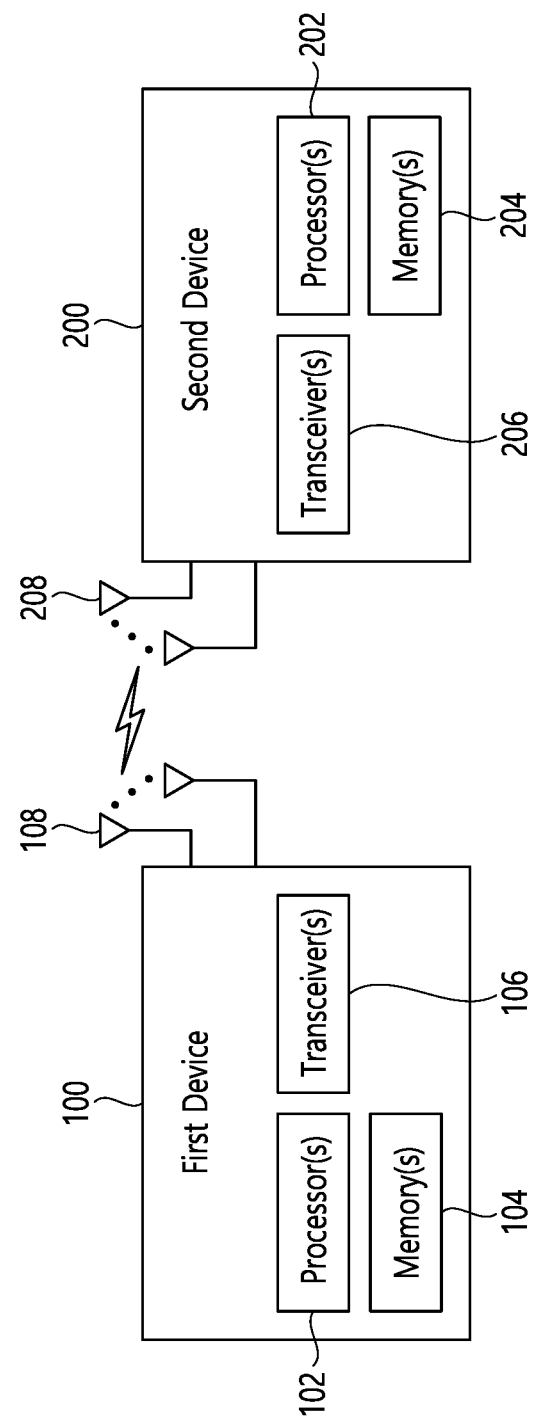
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory (s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory (s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
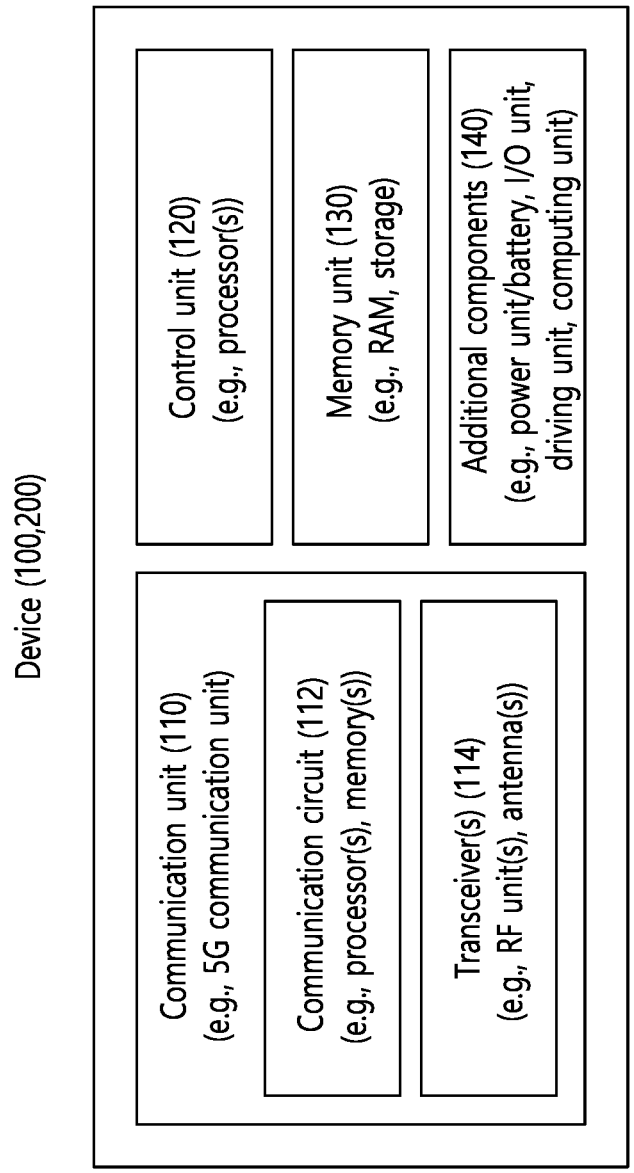
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
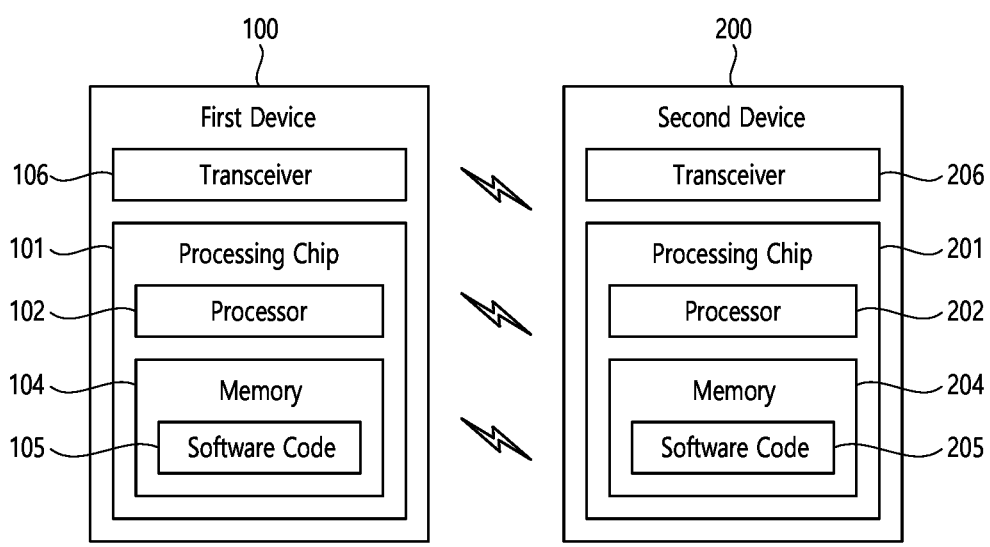
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
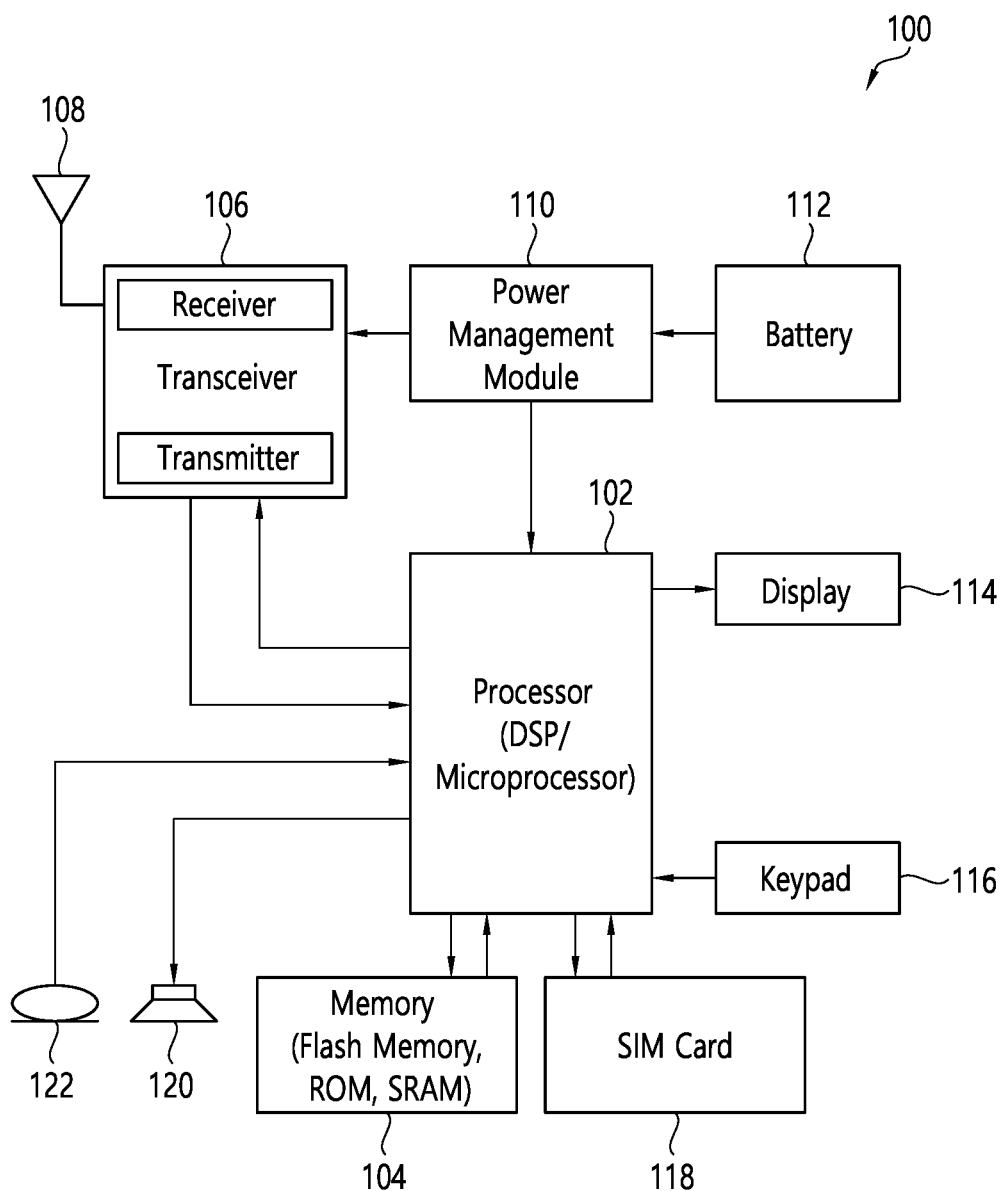
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
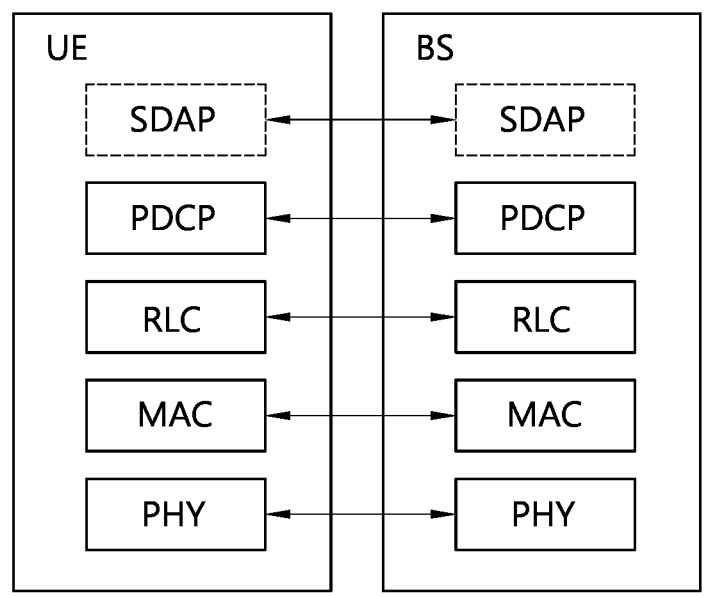
FIGS. 6 and 7 show an example of protocol stacks in a 3GPP based wireless communication system to which implementations of the present disclosure is applied.
Figure 7:
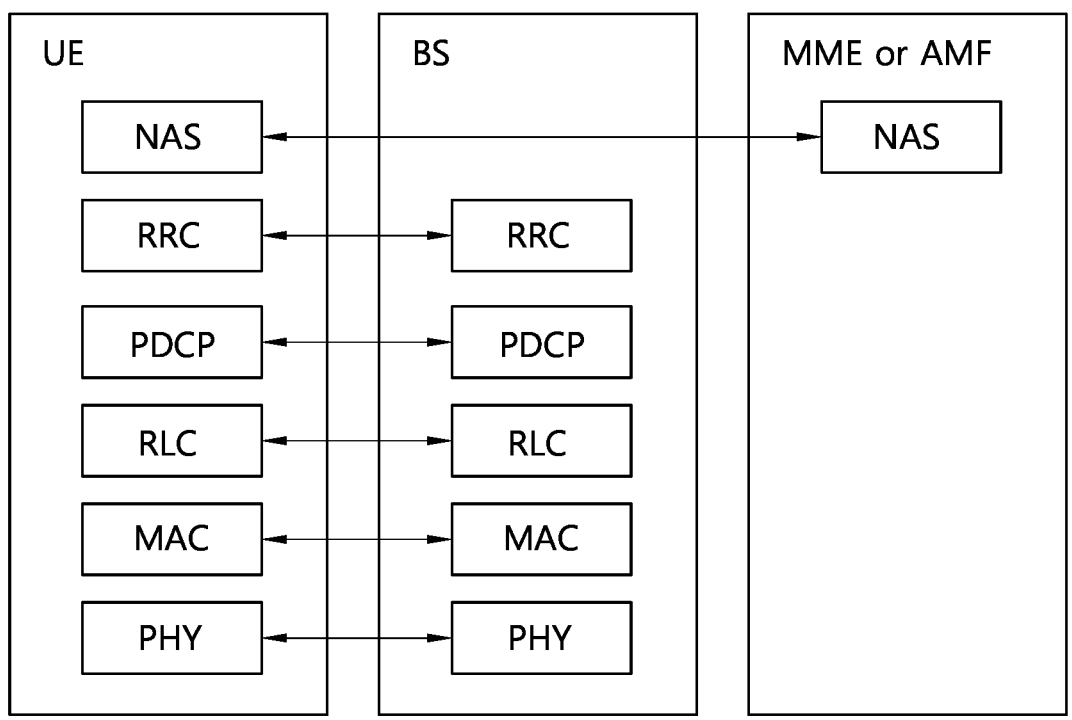

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
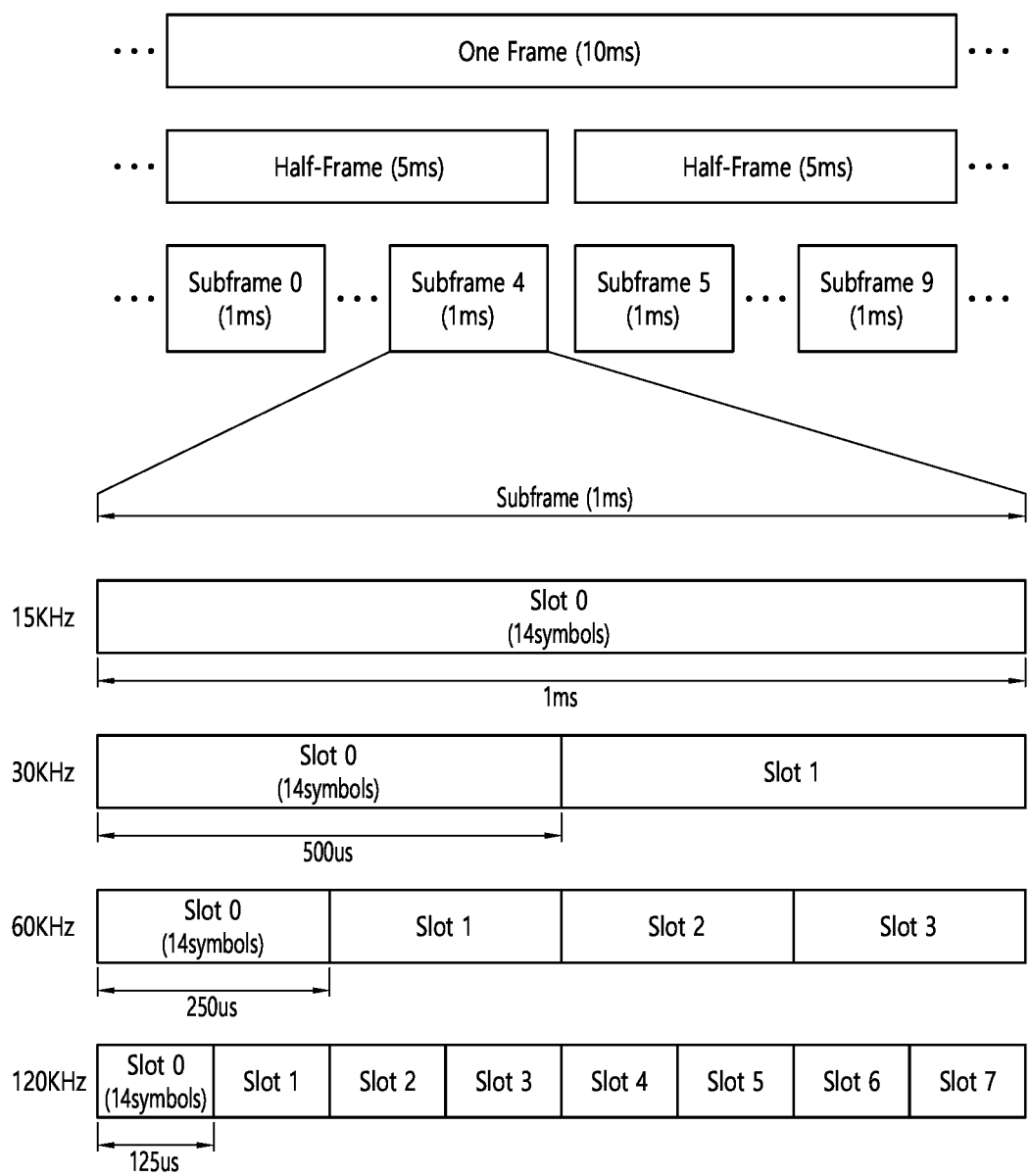
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
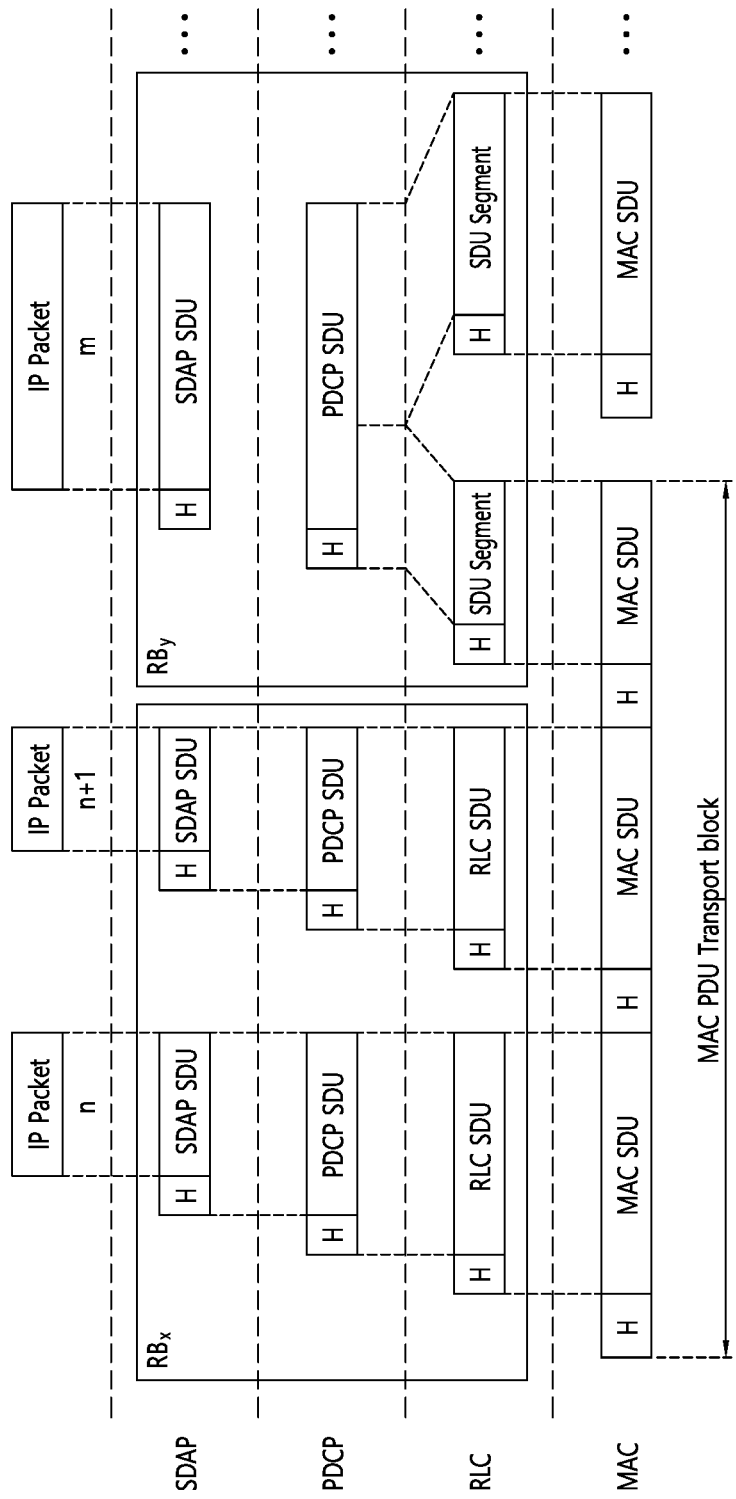
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a random access response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the cell radio network temporary identifier (C-RNTI) on PDCCH(s). A UE always monitors the PDCCH(s) in order to find possible grants for uplink transmission when its downlink reception is enabled (activity governed by discontinuous reception (DRX) when configured). In addition, with configured grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to configured scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with semi-persistent Scheduling (SPS), the BS can allocate downlink resources for the initial HARQ transmissions to UEs. RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

For resource allocation by PDCCH (i.e., resource allocation by DCI), PDCCH can be used to schedule DL transmissions on PDSCH and UL transmissions on PUSCH, where the DCI on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Hereinafter, handover procedure is described. It may be referred to as Section 9.2.3.2 of 3GPP TS 38.300 v15.5.0.

C-Plane handling is described. The intra-NR RAN handover performs the preparation and execution phase of the handover procedure performed without involvement of the 5GC. For example, preparation messages are directly exchanged between the gNBs. The release of the resources at the source gNB during the handover completion phase is triggered by the target gNB. The basic handover scenario where neither the AMF nor the UPF changes is as follow.

0. The UE context within the source gNB contains information regarding roaming and access restrictions which were provided either at connection establishment or at the last TA update.

1. The source gNB configures the UE measurement procedures and the UE reports according to the measurement configuration.

2. The source gNB decides to handover the UE, based on MeasurementReport and RRM information.

3. The source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information (if supported) and QoS flow level QoS profile(s).

After issuing a Handover Request, the source gNB should not reconfigure the UE, including performing Reflective QoS flow to DRB mapping.

4. Admission Control may be performed by the target gNB. Slice-aware admission control shall be performed if the slice information is sent to the target gNB. If the PDU sessions are associated with non-supported slices the target gNB shall reject such PDU Sessions.

5. The target gNB prepares the handover with L1/L2 and sends the HANDOVER REQUEST ACKNOWLEDGE to the source gNB, which includes a transparent container to be sent to the UE as an RRC message to perform the handover.

6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

7. The source gNB sends the SN STATUS TRANSFER message to the target gNB.

8. The UE synchronises to the target cell and completes the RRC handover procedure by sending RRCReconfigurationComplete message to target gNB.

9. The target gNB sends a PATH SWITCH REQUEST message to AMF to trigger 5GC to switch the DL data path towards the target gNB and to establish an NG-C interface instance towards the target gNB.

10. 5GC switches the DL data path towards the target gNB. The UPF sends one or more "end marker" packets on the old path to the source gNB per PDU session/tunnel and then can release any U-plane/TNL resources towards the source gNB.

11. The AMF confirms the PATH SWITCH REQUEST message with the PATH SWITCH REQUEST ACKNOWLEDGE message.

12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

Conditional handover (CHO) has been discussed in LTE and NR to improve handover robustness. In the CHO procedure, the network can configure multiple candidate cells with CHO triggering condition to UE via RRC dedicated signalling. UE may perform access to one of the candidate cells which satisfies the CHO triggering condition.

The motivation for the handover procedure based on a configured condition is to reduce the time to taken for transmission of measurement reporting and reception of handover command and handover preparation so that it would be possible to reduce the handover failure caused by not receiving handover command at a proper time.

Figure 10:
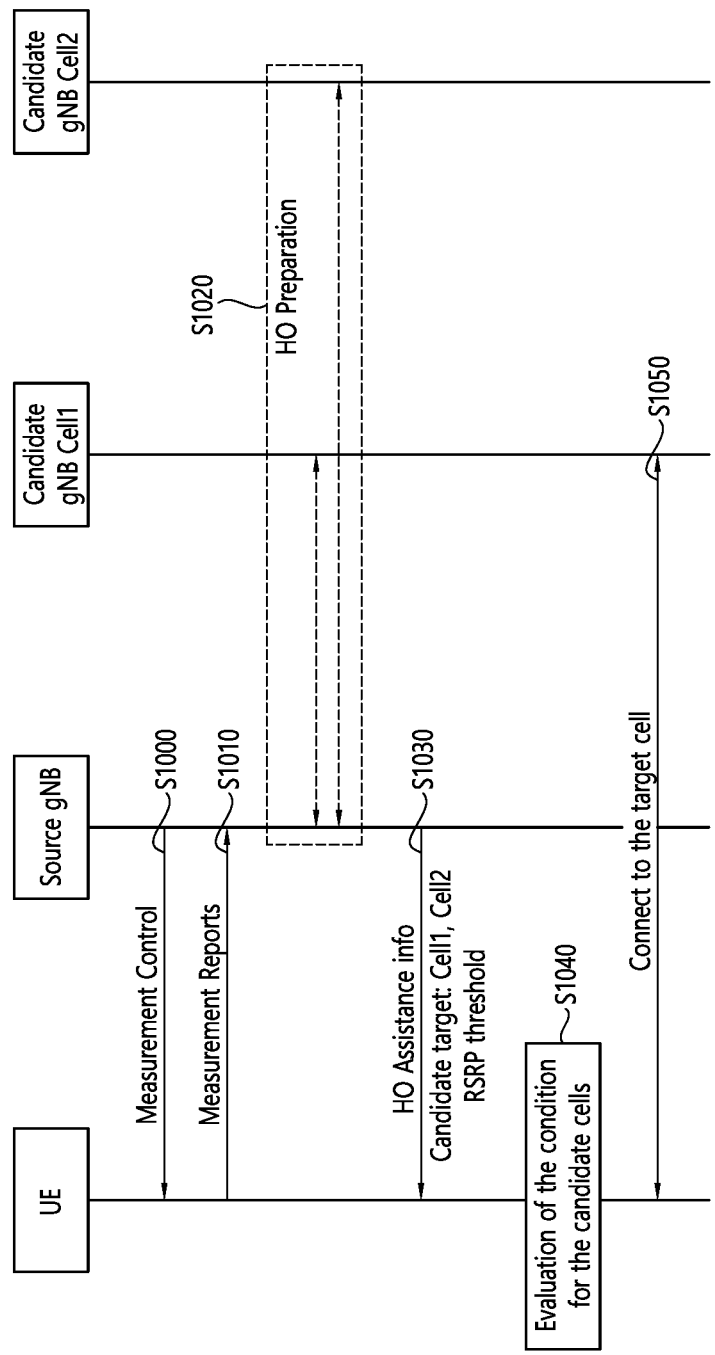
FIG. 10 shows an example of overall procedure for condition based autonomous handover procedure to which implementations of the present disclosure is applied.

FIG. 10 shows an example of overall procedure for condition based autonomous handover procedure to which implementations of the present disclosure is applied.

In step S1000, the source gNB may provide measurement control information to the UE. In step S1010, the UE may transmit measurements reports based on the measurement control information.

In step S1020, the source gNB may prepare condition based autonomous handover procedure with candidate cells (e.g., Cell1 and Cell2 in FIG. 10). In step S1030, the source gNB provides handover assistance information to the UE.

The UE is provided with handover assistance information which includes set of candidate cells and conditions (e.g., RSRP) for handover. It may be possible the network prepares the candidate cells and provide the handover assistance information without the measurement report from the UE if the network is able to know the trajectory or location of the UE based on, e.g., location reporting. Additionally, the network may determine the set of candidate cells based on the received measurement report.

There may be a concern on signalling overhead due to earlier triggering threshold. Measurement reporting may be reduced if an approach similar to blacklisted cells is introduced. In other words, if the UE reports on one cell, the network may prepare the multiple cells which is in proximity of the reported cell and provide the list of cells which are prepared. Then, the UE may not report on the cells even if the condition for measurement reporting is triggered.

The handover assistance information may be cell quality based conditions and the configuration which may be used in a target cell. The handover assistance information may include configuration for one or more candidate cells.

In step S1040, if the UE receives the handover assistance information, the UE initiates to evaluate the conditions for the candidate cell list to determine whether to perform handover procedure to one of the candidate cells.

In step S1050, if the condition is met, the UE performs connecting to the prepared target cell.

For this procedure, since the source gNB may not know the exact timing of UE detaching from the source gNB, there may be some unnecessary downlink transmissions from the network to the UE. To address this issue, the target gNB may indicate to source gNB that the UE has completed handover successfully so that the source gNB does not transmit to the UE anymore. In addition, if the source gNB does not receive the response for the transmitted data, the source gNB may not transmit the data in downlink considering the handover situation.

As reserving the resource in one or more candidate cell is burdensome to the network, it may be possible for the network to manage the configuration efficiently. For instance, based on the timer associated with validity of the handover assistance information, the network and UE may discard the configuration associated with the conditional handover. In addition, based on measurement report from the UE, network may configure, modify and/or discard the configuration.

Furthermore, if the UE successfully connects to the target cell, the target cell may inform to the source cell to discard the reserved configuration of the other candidate cell.

Meanwhile, in a normal handover, a wireless device may perform a handover from a source base station (BS) to a target BS. The source BS may provide, to the target BS, measurement results of the best cell for each frequency, so that the target BS could setup carrier aggregation (CA) and/or dual connectivity (DC) immediately.

For example, the wireless device may receive, from the source BS, handover (HO) command including a SCell configuration for CA and/or DC in response to the measurement results. Then, the wireless device could perform the handover to the target BS, and establish the CA and/or the DC immediately based on the SCell configuration.

Figure 11:
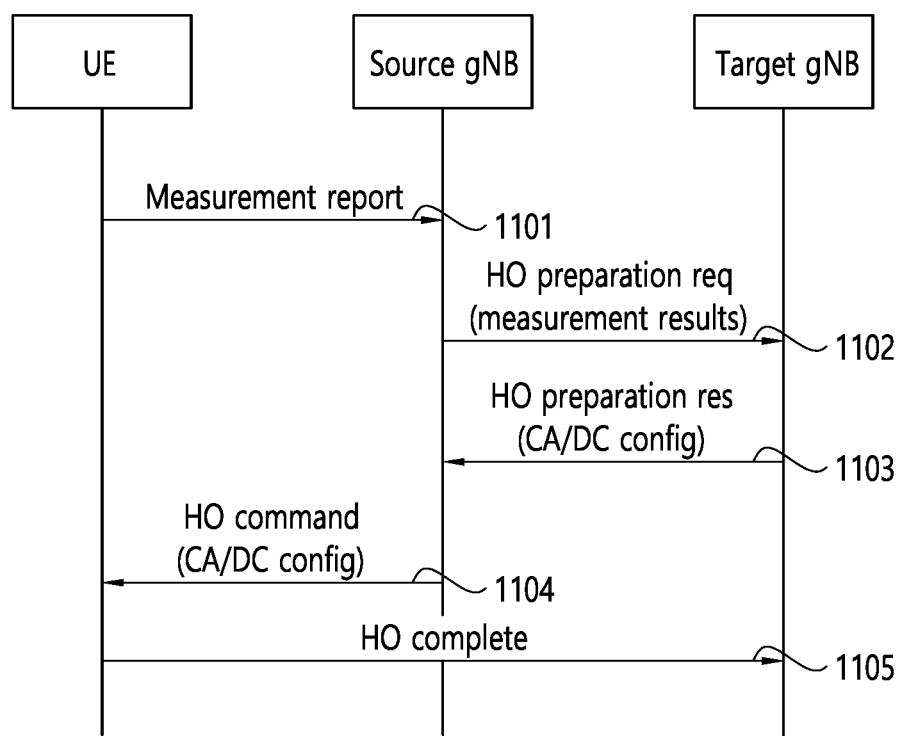
FIG. 11 shows an example of a scenario for managing the CA and/or DC configuration in a normal handover procedure to explain some embodiments of the present disclosure.

FIG. 11 shows an example of a scenario for managing the CA and/or DC configuration in a normal handover procedure to explain some embodiments of the present disclosure.

In particular, in FIG. 11, a wireless device (for example, a UE) may perform a handover from a source BS (for example, a source gNB) to a target BS (for example, a target gNB).

In step 1101, the UE may transmit, to the source gNB, a measurement report. In step 1102, the source gNB may transmit, to the target gNB, a handover preparation request including the measurement results.

In step 1103, the target gNB may transmit, the handover response including the CA configuration and/or the DC configuration. For example, the CA configuration and/or the DC configuration may include SCell configuration for the CA and/or the DC.

In step 1104, the source gNB may transmit the handover command including the CA configuration and/or the DC configuration.

The UE may perform the handover based on the handover command. The UE may also establish the CA and/or the DC based on the CA configuration and/or the DC configuration.

In step 1105, the UE may transmit, to the target gNB, handover complete message.

However, in a conditional handover, a wireless device may not perform the handover upon receiving the handover command.

Figure 12:
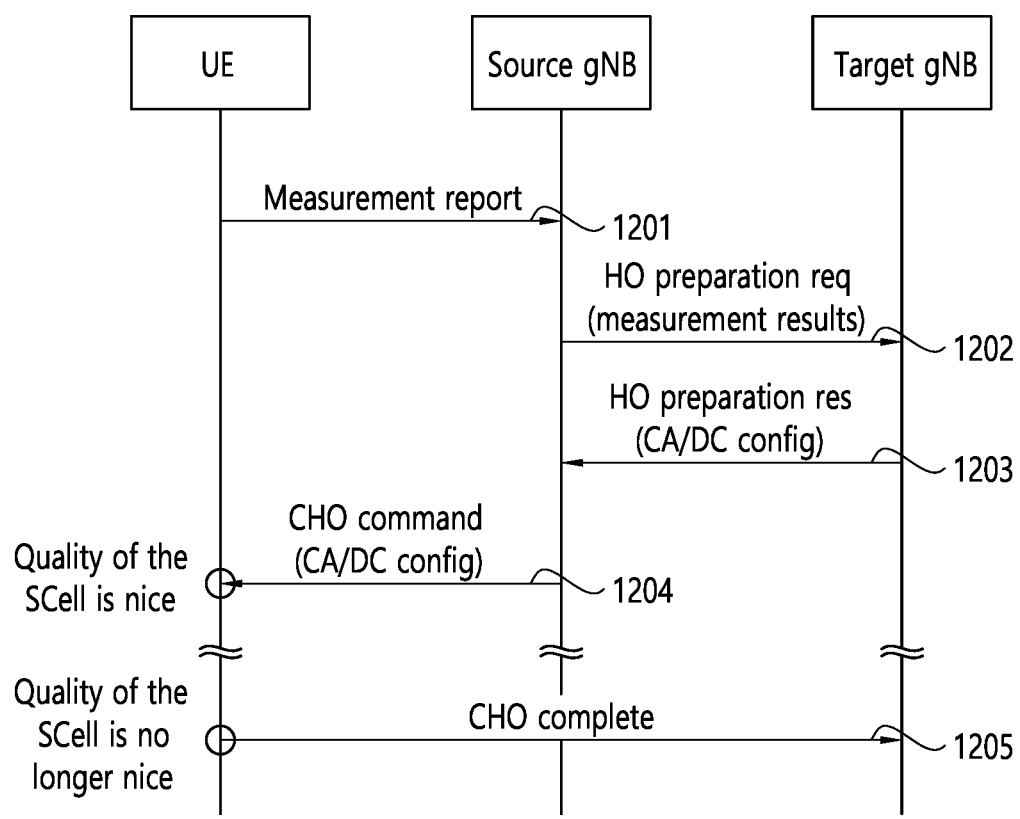
FIG. 12 shows an example of a scenario for managing the CA and/or DC configuration in a conditional handover procedure to explain some embodiments of the present disclosure.

FIG. 12 shows an example of a scenario for managing the CA and/or DC configuration in a conditional handover procedure to explain some embodiments of the present disclosure.

In a conditional handover, a wireless device may execute the handover from the source BS to the target BS when a condition for the conditional handover is met. In other words, the wireless device may not execute the handover as soon as receiving the conditional handover (CHO) command.

Thus, though the source BS provides the measurement results to target BS and the wireless device receives the CHO command including the SCell configuration for a CA and/or a DC from the target BS, the SCell configuration could be outdated when the wireless device actually executes the handover.

Referring to FIG. 12, a wireless device (for example, a UE) may perform a conditional handover from a source BS (for example, a source gNB) to a target BS (for example, a target gNB).

In step 1201, the UE may transmit, to the source gNB, a measurement report. In step 1202, the source gNB may transmit, to the target gNB, a handover preparation request including the measurement results.

In step 1203, the target gNB may transmit, the handover response including CA configuration and/or the DC configuration. For example, the CA configuration and/or the DC configuration may include SCell configuration for the CA and/or the DC.

In step 1204, the source gNB may transmit the conditional handover command including the CA configuration and/or the DC configuration.

For example, the quality of the SCell included in the CA configuration and/or the DC configuration could be nice when the UE receive the conditional handover command. However, the UE may not perform the conditional handover immediately based on the conditional handover command.

The UE may perform the conditional handover when at least one of conditions for candidate cells is met. Therefore, when the UE perform the conditional handover, quality of the SCell included in the CA configuration and/or the DC configuration could be no longer nice. That is, the UE does not need to establish the CA and/or the DC with the SCell.

In step 1205, the UE may transmit, to the target gNB, handover complete message after performing the conditional handover to the target gNB.

Thus, a wireless device could waste resource to receive the CA configuration and/or the DC configuration.

Figure 13:
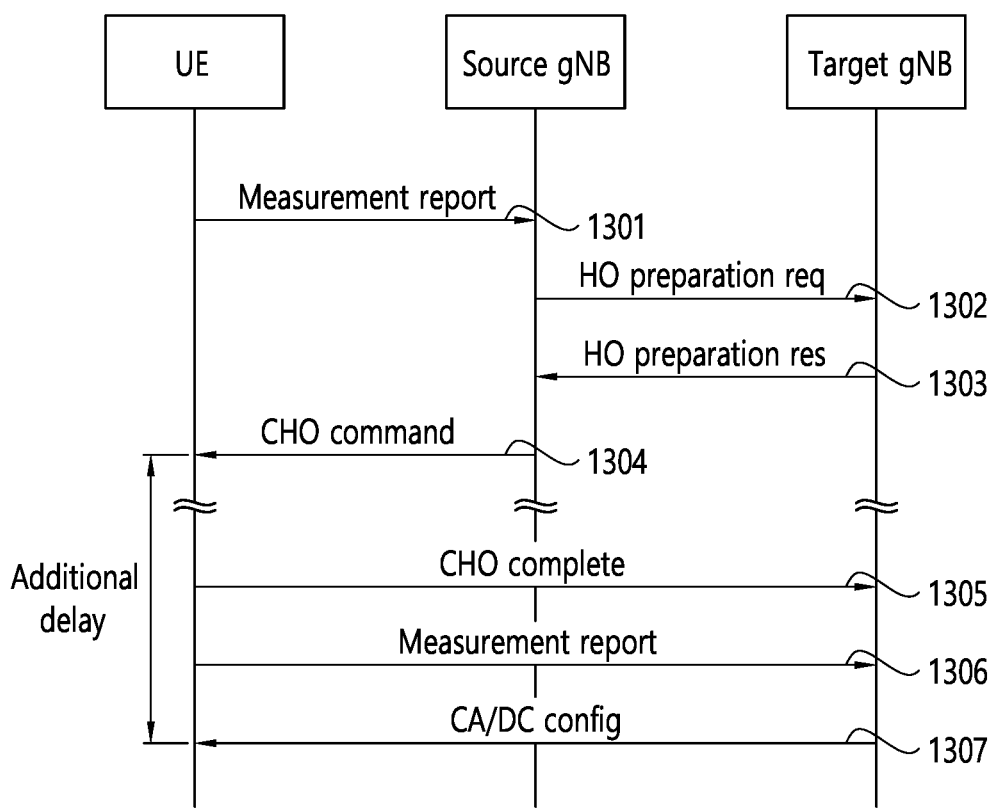
FIG. 13 shows an example of a scenario for managing the CA and/or DC configuration after a conditional handover procedure to explain some embodiments of the present disclosure.

FIG. 13 shows an example of a scenario for managing the CA and/or DC configuration after a conditional handover procedure to explain some embodiments of the present disclosure.

In this example, the target BS could configure the CA and/or the DC only after receiving the measurement results from the wireless device directly. For example, the target BS may transmit, to the wireless device the SCell configuration for a CA and/or a DC based on the up-to-date measurement results. In this case, the secondary cell (SCell) addition for the CA and/or the DC could be significantly delayed.

Referring to FIG. 13, a wireless device (for example, a UE) may receive the CA configuration and/or the DC configuration after performing a conditional handover from a source BS (for example, a source gNB) to a target BS (for example, a target gNB).

In step 1301, the UE may transmit, to the source gNB, a measurement report. In step 1302, the source gNB may transmit, to the target gNB, a handover preparation request. In step 1303, the target gNB may transmit, the handover response. For example, the handover response. In step 1304, the source gNB may transmit the conditional handover command.

The UE may perform the conditional handover when at least one of conditions for candidate cells is met. In step 1305, the UE may transmit, to the target gNB, handover complete message after performing the conditional handover to the target gNB.

In step 1306, the UE may transmit measurement report to the target gNB. In step 1307, the target gNB may transmit, to the UE, the CA configuration and/or the DC configuration. For example, the CA configuration and/or the DC configuration may include SCell configuration.

As described above, in this example, the secondary cell (SCell) addition for the CA and/or the DC could be significantly delayed from the conditional handover.

Therefore, studies for managing SCells during a conditional PCell handover in a wireless communication system are required.

Hereinafter, a method for managing SCells during a conditional PCell handover in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 14:
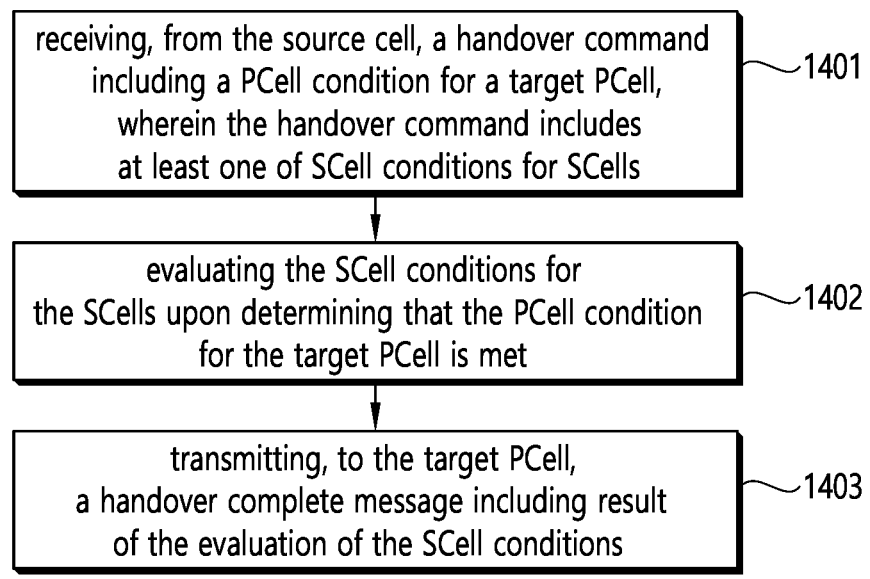
FIG. 14 shows an example of a method for managing SCells during a conditional PCell handover in a wireless communication system, according to some embodiments of the present disclosure.

FIG. 14 shows an example of a method for managing SCells during a conditional PCell handover in a wireless communication system, according to some embodiments of the present disclosure.

In particular, FIG. 14 shows an example of a method for performed by a wireless device.

In this example, a wireless device may establish a connection with a network. For example, the wireless device may establish a Radio Resource Control (RRC) connection with a serving cell or a source PCell. For example, the wireless device may establish the RRC connection with a source Primary Cell (PCell) and Source Secondary Cells (SCells).

In step 1401, a wireless device may receive, from the source PCell, a handover command including a PCell condition for a target PCell. The handover command may include at least one of Secondary Cell (SCell) conditions for target SCells.

According to some embodiments of the present disclosure, the handover command may further include another PCell condition for another target PCell. For example, another target PCell may be different from the source PCell and the target PCell. For example, the handover command may include plurality conditions for multiple PCells.

According to some embodiments of the present disclosure, the PCell conditions in the handover command may be correspond to at least one of the SCell conditions in the handover command.

For example, the SCells may include a first SCell related to the target PCell and a second SCell related to the other target PCell. For example, the wireless device could establish a CA and/or a DC with the first SCell, when the wireless device handovers to the target PCell.

For example, the wireless device could establish a CA and/or a DC with the second SCell, when the wireless device handovers to the other target PCell.

According to some embodiments of the present disclosure, the handover command may include SCell configuration for target SCells. In this example, the handover command may include the at least one of the SCell conditions for the target SCells and the SCell configuration.

According to some embodiments of the present disclosure, the wireless device may establish connections with source SCells before receiving the handover command In this case, a wireless device may receive 'keeping indication' for at least one of the source SCells. For example, the 'keeping indication' may indicate at least one of the source SCells.

For example, the 'keeping indication' may be included in the handover command In other words, the handover command may include the 'keeping indication' and the SCell conditions for the source SCells.

In step 1402, a wireless device may evaluate the SCell conditions for the target SCells upon determining that the PCell condition for the target PCell is met.

For example, a wireless device may perform measurement on the target PCell and the target SCells. For example, the measurement may be performed periodically. For example, the measurement may be performed when at least one of measurement events is occurred.

If the wireless device determines that the PCell condition for the target PCell is met, the wireless device may evaluate each of the SCell conditions for the target SCells based on the measurement result.

According to some embodiments of the present disclosure, the wireless device may apply a connection with at least one of the target SCells, based on that the at least one of the target SCells is evaluated to be satisfied the at least one of the SCell conditions for the target SCells.

In other words, if the wireless device evaluates that the at least one of the target SCells satisfies the at least one of the SCell conditions, the wireless device may apply the connection with the at least one of the target SCells.

According to some embodiments of the present disclosure, a wireless device may establish a connection with the source SCells before receiving the handover command in step 1401.

In this case, the wireless device may keep a connection with at least one of the source SCells, based on that the at least one of the source SCells is evaluated to be satisfied the at least one of the SCell conditions for the source SCells.

In addition, the wireless device may release a connection with at least one of the source SCells, based on that the at least one of the source SCell is evaluated not to be satisfied the at least one of the SCell conditions for the source SCells.

For example, if the wireless device decides that the at least one of the source SCells satisfies the at least one of the SCell conditions, the wireless device may keep the connection with the at least one of the source SCells and release the connection with the others of the source SCells.

According to some embodiments of the present disclosure, the handover command may include at least one of PCell conditions for multiple target PCells and at least one of SCell conditions for multiple sets of target SCells. For example, each of the multiple sets of the target SCells is associated with each of the multiple target PCells.

In this case, a wireless device may evaluate the at least one of the SCell conditions only for a specific set of the target SCells, upon determining that the at least one of the PCell conditions for a specific PCell is met. The specific set of the target SCells may be associated with the specific target PCell.

For example, the wireless device may not evaluate the at least one of the SCell conditions for the other sets of the target SCells.

According to some embodiments of the present disclosure, the SCell conditions for the SCells could be independent from the PCell conditions for the target PCells. For example, the SCells may not be corresponded to at least one of the target PCells.

In step 1403, a wireless device may transmit, to the target PCell, a handover complete message including result of the evaluation of the SCell conditions for the target SCells.

According to some embodiments of the present disclosure, a wireless device may decide that at least one of the target SCells satisfies the at least one of the SCell conditions based on the evaluation. In this case, the wireless device may transmit, to the target PCell, the handover complete message including information on at least one of the target SCells, based on that the at least one of the target SCells is evaluated to be satisfied the at least one of the SCell conditions. For example, the information on the at least one of the target SCells may include the identifier (ID) of the at least one of the target SCells.

According to some embodiments of the present disclosure, a wireless device may decide that none of the target SCells satisfies the at least one of the SCell conditions based on the evaluation. In this case, the wireless device may transmit, to the target PCell, the handover complete message including information informing that none of the target SCells satisfies the at least one of the SCell conditions.

According to some embodiments of the present disclosure, a wireless device may perform handover to the target PCell based on that the PCell condition is met. For example the wireless device may transmit, to the target PCell, the handover complete message after establishing a connection with the target PCell.

In this case, the wireless device may establish a connection with at least one of target SCells which is met the at least one of the SCell conditions. The wireless device may start to establish a CA and/or a DC for the PCell with the at least one of the target SCells based on that the at least one of the target SCells is evaluated to be satisfied the at least one of the SCell conditions.

According to some embodiments of the present disclosure, the target PCell may start to establish a CA and/or a DC with at least one of target SCells upon receiving the handover complete message. For example, the target PCell may establish the CA and/or the DC with the at least one of the target SCells based on the result of the evaluation of the SCell conditions.

According to some embodiments of the present disclosure, a wireless device may be in communication with at least one of a user equipment, a network, or an autonomous vehicle other than the wireless device.

Figure 15:
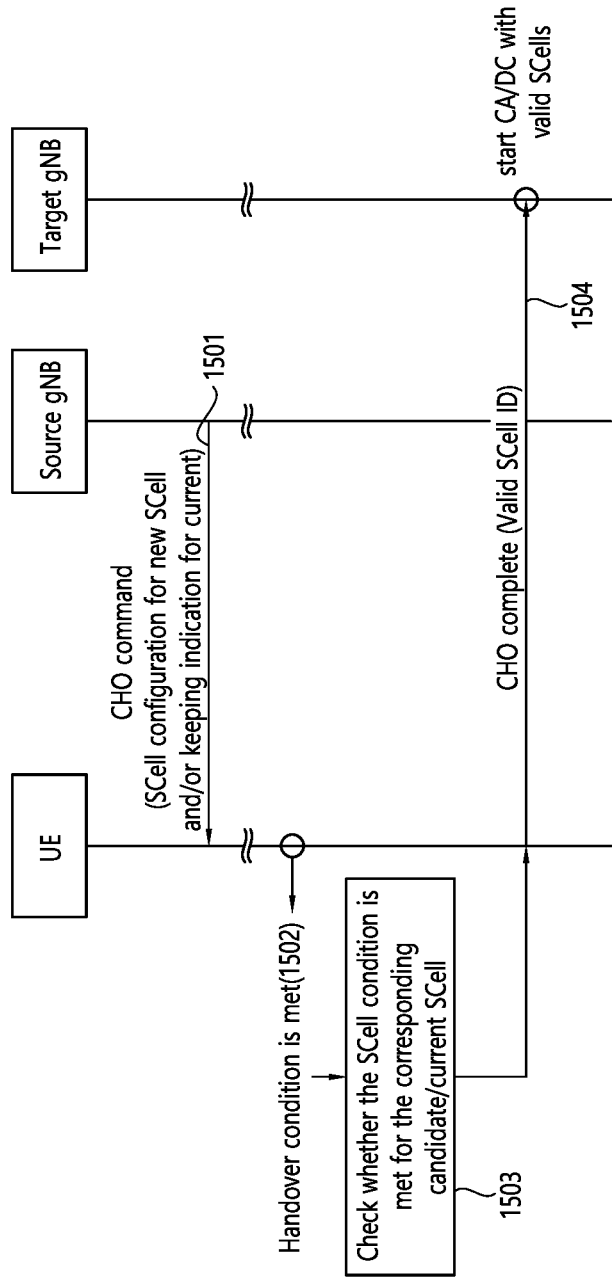
FIG. 15 shows an example of a method for managing SCells during a conditional PCell handover in a wireless communication system, according to some embodiments of the present disclosure.

FIG. 15 shows an example of a method for managing SCells during a conditional PCell handover in a wireless communication system, according to some embodiments of the present disclosure.

In particular, in FIG. 15, a UE may perform a conditional handover from a source gNB to a target gNB.

According to some embodiments of the present disclosure, a UE may establish a connection with a network (for example, the source gNB). For example, the UE may perform initial access towards a cell in the source gNB. The UE and the cell may perform RACH procedure. The UE may establish or resume a connection with the source gNB and enters RRC_CONNECTED state. The UE may perform AS security activation upon receiving Security Mode Command from the source gNB. The UE may configure radio bearers and radio configuration upon receiving RRC reconfiguration. Otherwise, the UE may resume radio bearers and radio configuration upon receiving RRC resume.

According to some embodiments of the present disclosure, the UE may perform steps 1201 to 1203 before performing step 1501.

Referring to FIG. 15, in step 1501, the UE may receive conditional handover (CHO) command from the source PCell. For example, the source PCell may be a serving cell. For example, the source PCell may be provided by the source gNB in FIG. 12.

For example, the CHO command may include at least one PCell condition. The at least one PCell condition may be used for handover condition. For example, the UE may determine whether a target cell can be a candidate for conditional handover based on the at least one PCell condition.

For example, the CHO command may further include at least one SCell condition. The at least one SCell condition may be used for the CA condition and/or the DC condition. For example, the UE may determine whether to add a SCell for the corresponding PCell (a target PCell) in the CA procedure and/or the DC procedure based on the SCell condition.

In step 1502, UE may check whether the PCell condition is met for a candidate target PCell.

In step 1503, UE may check whether the SCell condition is met for each of candidate SCells.

For example, when the PCell condition is met for the candidate target PCell, the UE may check whether the SCell condition is met for each of candidate SCells related to the candidate target PCell.

If the SCell condition is met for a candidate SCell, UE may apply the corresponding SCell configuration for the candidate SCell. The UE may inform the candidate target PCell of the information, for example, identity of the candidate SCell.

In step 1504, UE may transmit, to the target PCell, a CHO complete message. For example, the CHO complete message may include information on the candidate SCell(s), when the candidate SCell(s) satisfies the SCell condition. For example, the CHO complete message may include the identity of the candidate SCell(s). For example, when the target PCell receives the CHO complete message, the target PCell may start to establish a CA and/or a DC with valid SCells based on the information on the candidate SCell(s).

According to some embodiments of the present disclosure, if the SCell condition is not met for a candidate SCell, the UE may not apply the corresponding SCell configuration for the candidate SCell. For example, the UE may discard the SCell configuration for the candidate SCell.

According to some embodiments of the present disclosure, the SCell configuration may be related to at least one candidate SCell. The SCell configuration may include the mapping information between the SCell configurations and candidate SCells. For example, candidate SCell(s) could be mapped to the SCell configuration. The SCell configuration can be included in the conditional handover command in step 1501.

According to some embodiments of the present disclosure, the SCell condition may be mapped to at least one candidate SCell, and the SCell condition may not include the mapping information. If the mapping information for the SCell condition is not provided, the UE may consider the SCell condition is applicable to all candidate SCells.

For example, the SCell condition may include that the measurement result of the (candidate) SCell is higher than a threshold.

Herein, the terminology 'SCell' may include Primary SCell. For example, PSCell may be one of the cells belong to secondary cell group (SCG).

According to some embodiments of the present disclosure, the configuration for candidate PSCell and corresponding PSCell condition also could be included in the conditional handover message.

According to some embodiments of the present disclosure, in step 1504, when the PCell condition is met for the candidate target PCell, the UE may initiates the transmission of handover complete message to the handover target cell. For example, the UE may perform conditional handover without SCell change. The UE keeps the SCell configured by source cell even after handover completion while the UE performs the handover without SCell change.

It is described above that the present disclosure is applied to conditional handover with SCell change. The present disclosure can be applied to conditional handover without SCell change. The handover without SCell change means that the UE keeps the SCell configured by source cell even after handover completion.

In this case, the CHO command could include 'keep SCell' indicator for each SCell per candidate target PCell. The SCell indicated by the 'keep SCell' indicator may not be changed even after handover is completed. In other words, the SCell indicated by the 'keep SCell' indicator may be kept even after the PCell change.

For example, the SCell configuration may not be included in the CHO command because the UE already has the configuration for its SCells.

According to some embodiments of the present disclosure, the UE may check all SCell related to the target PCell. When the PCell condition is met for the candidate target PCell in step 1502, the UE may checks whether all of the SCell condition is met for each of SCells related to the candidate target PCell in step 1503.

For example, if the SCell condition is met for an SCell, UE may keep the SCell, and inform the candidate target PCell of the information. For example, the UE may transmit, to the target PCell, a CHO complete message including identity of the SCell.

In this case, if the SCell condition is not met for an SCell, the UE may release the SCell. Then, the UE may inform the handover target cell which SCell is released and/or which SCell is being kept. For example, the UE may transmit, to the target PCell, the CHO complete message including information informing which SCell is released and/or which SCell is being kept.

Figure 16:
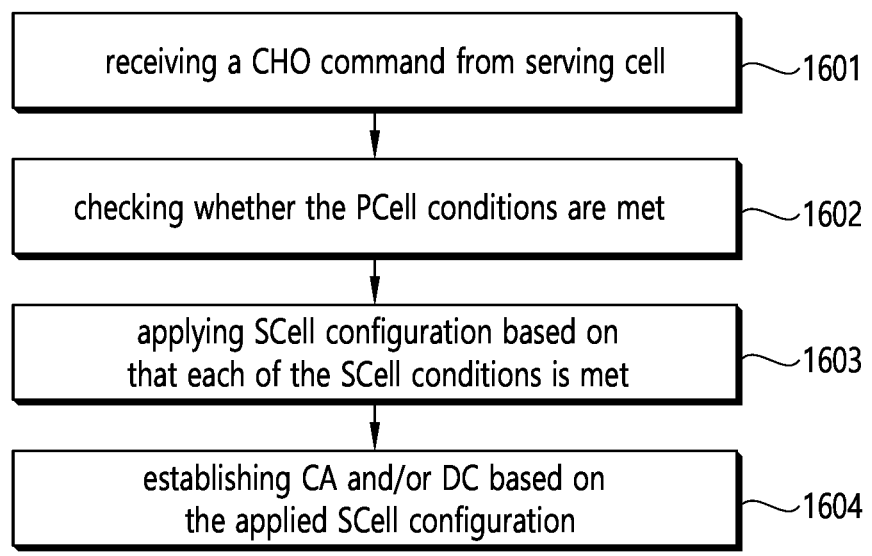
FIG. 16 shows an example of a method for managing SCells during a conditional PCell handover in a wireless communication system, according to some embodiments of the present disclosure.

FIG. 16 shows an example of a method for managing SCells during a conditional PCell handover in a wireless communication system, according to some embodiments of the present disclosure.

In particular, in this example, a UE may apply SCell configuration when at least one of SCell conditions for candidate SCell is met.

In step 1601, UE may receive a CHO (conditional handover) command from serving cell. The CHO command includes handover conditions (for example, PCell condition) and SCell conditions.

Table 5 and table 6 below show an example of the handover condition.

TABLE 5

PCell condition 1: Cell A becomes better than serving cell
SCell condition 1: Cell C becomes better than threshold 1
SCell condition 2: Cell D and/or E becomes better than threshold 2

For example, the SCell condition 1 and 2 could be mapped to PCell condition 1.

TABLE 6

PCell condition 2: Cell B becomes better than serving cell
SCell condition 3: Cell F becomes better than threshold 3
SCell condition 4: Cell G becomes better than threshold 4

For example, the SCell condition 3 and 4 could be mapped to PCell condition 2. In other words, the cell C (in SCell condition 1) and cell D and E (in SCell condition 2) may be candidate SCells when the UE is handed over to the cell A (in PCell condition 1).

In addition, the cell F (in SCell condition 3) and cell G (in SCell condition 4) may be candidate SCells when the UE is handed over to the cell B (in PCell condition 2).

For example, the CHO command may include the SCell configuration for one or more SCell (for example, cells C, D, E, F, and G).

In step 1602, the UE may check whether the PCell conditions are met. For example, the PCell condition 1 may be met. Then, the UE may check whether SCell condition is met or not for the SCell condition 1 and 2.

According to some embodiments of the present disclosure, the UE may not check whether SCell condition is met or not for the SCell condition 3 and 4, because the SCell condition 3 and 4 are mapped to only PCell condition 2.

In step 1603, the UE may apply SCell configuration based on that each of the SCell conditions is met.

For example, if the SCell condition 2 is met for cell D, the UE may apply the SCell configuration related to the cell D only. For example, since the SCell condition 1 and the SCell condition 2 for cell E are not met, the UE may not apply the SCell configuration related to the cell C and the cell E.

For example, the SCell configuration for cell C, D and E may be included in the CHO command from the source PCell.

According to some embodiments of the present disclosure, the UE may inform the handover target cell (for example, cell A) that the UE has applied the SCell configuration for cell D via CHO complete message.

In step 1604, the UE may establish carrier aggregation and/or dual connectivity the applied SCell configuration. For example, the cell A may start carrier aggregation or dual connectivity operation using cell D for the UE.

For example, if the UE does not apply the SCell configuration because all of the SCell conditions are not met, the UE may not establish CA and/or DC.

Figure 17:
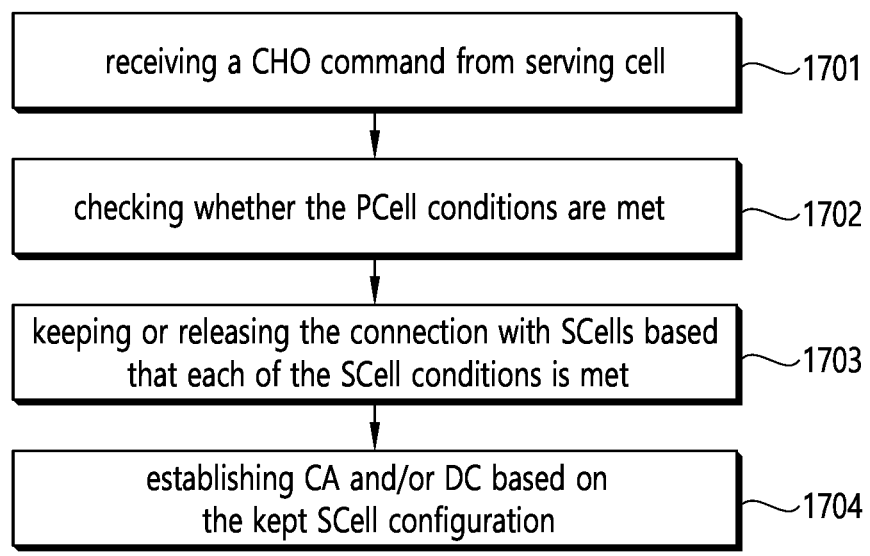
FIG. 17 shows an example of a method for managing SCells during a conditional PCell handover in a wireless communication system, according to some embodiments of the present disclosure.

FIG. 17 shows an example of a method for managing SCells during a conditional PCell handover in a wireless communication system, according to some embodiments of the present disclosure.

In particular, in this example, a UE may keep or release connection with SCells based on SCell conditions.

In step 1701, the UE may receive a CHO (conditional handover) command from serving cell. For example, cell C, D, E, F and G may have been configured as SCells for the UE. The CHO command may include handover conditions (for example, PCell condition) and SCell conditions.

Table 5 and table 6 above show an example of the handover condition. For example, the SCell condition 1 and 2 could be mapped to PCell condition 1 and the SCell condition 3 and 4 could be mapped to PCell condition 2.

In step 1702, the UE may check whether the PCell conditions are met. For example, the PCell condition 1 may be met. Then, the UE may check whether SCell condition is met or not for the SCell condition 1 and 2. In this case, the UE may not check whether SCell condition is met or not for the SCell condition 3 and 4, since the SCell condition 3 and 4 are mapped to only PCell condition 2.

In step 1703, the UE may keep or release the connection with SCells based that each of the SCell conditions is met.

For example, the SCell condition 2 may be met for cell D, meanwhile the SCell condition 1 and the SCell condition 2 for cell E may be not met. Then, the UE may keep the cell D only, and releases cell C, E, F and G, because for the cell C and the cell E, the SCell condition is not met and, for the cell F and the cell G, they are not related to the PCell condition 1.

According to some embodiments of the present disclosure, the UE may inform the target cell (for example, cell A) that the UE keeps the cell D as an SCell, via CHO complete message. For example, the UE may inform the target cell that the cell C, E, F and G are released via CHO complete message.

In step 1704, the UE may establish carrier aggregation and/or dual connectivity based on the kept SCell configuration. For example, the cell A may start carrier aggregation or dual connectivity operation using cell D for the UE.

For example, if the UE does not keep the SCell configuration because all of the SCell conditions are not met, the UE may not establish CA and/or DC.

Hereinafter, an apparatus for managing SCells during a conditional PCell handover in a wireless communication system, according to some embodiments of the present disclosure, will be described. Herein, the apparatus may be a wireless device (100 or 200) in FIGS. 2, 3, and 5.

For example, a wireless device may perform methods described in FIGS. 14 to 17. The detailed description overlapping with the above-described contents will be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to establish a connection with a source Primary Cell (PCell). The processor 102 may be configured to control the transceiver to receive, from the source PCell, a handover command including a PCell condition for a target PCell. The handover command may include at least one of Secondary Cell (SCell) conditions for target SCells. The processor 102 may be configured to evaluate the SCell conditions for the target SCells upon determining that the PCell condition for the target PCell is met. The processor 102 may be configured to control the transceiver to transmit, to the target PCell, a handover complete message including result of the evaluation of the SCell conditions for the target SCells.

According to some embodiments of the present disclosure, the processor 102 may be configured to apply a connection with at least one of the target SCells, based on that the at least one of the target SCells is evaluated to be satisfied the at least one of the SCell conditions for the target SCells.

According to some embodiments of the present disclosure, the processor 102 may be configured to establish a connection with source SCells before receiving the handover command. For example, the handover command may include at least one of SCell conditions for the source SCells.

For example, the processor 102 may be configured to keep a connection with at least one of the source SCells, based on that the at least one of the source SCells is evaluated to be satisfied the at least one of the SCell conditions for the source SCells. For other example, the processor 102 may be configured to release a connection with at least one of the source SCells, based on that the at least one of the source SCells is evaluated not to be satisfied the at least one of the SCell conditions for the source SCells.

According to some embodiments of the present disclosure, the handover complete message may include information on at least one of the target SCells, based on that the at least one of the target SCells is evaluated to be satisfied the at least one of the SCell conditions for the target SCells.

According to some embodiments of the present disclosure, the handover complete message may include information informing that none of the target SCells satisfies the at least one of the SCell conditions for the target SCells.

According to some embodiments of the present disclosure, the handover command may include at least one of PCell conditions for multiple target PCells and at least one of SCell conditions for multiple sets of target SCells. Each of the multiple sets of the target SCells is associated with each of the multiple target PCells.

In this case, the processor 102 may be configured to evaluate the at least one of the SCell conditions only for a specific set of the target SCells, upon determining that the at least one of the PCell conditions for a specific PCell is met. The specific set of the target SCells is associated with the specific target PCell.

According to some embodiments of the present disclosure, the processor 102 may be configured to perform handover to the target PCell based on that the PCell condition is met. The processor 102 may be configured to establish a carrier aggregation and/or a dual connectivity for the PCell with at least one of the target SCells based on that the at least one of the target SCells is evaluated to be satisfied the at least one of the SCell conditions for the target SCells.

Hereinafter, a processor for a wireless device for managing SCells during a conditional PCell handover in a wireless communication system, according to some embodiments of the present disclosure, will be described.

The processor may be configured to control the wireless device to establish a connection with a source Primary Cell (PCell). The processor may be configured to control the wireless device to receive, from the source PCell, a handover command including a PCell condition for a target PCell. The handover command may include at least one of Secondary Cell (SCell) conditions for target SCells. The processor may be configured to control the wireless device to evaluate the SCell conditions for the target SCells upon determining that the PCell condition for the target PCell is met. The processor may be configured to control the wireless device to transmit, to the target PCell, a handover complete message including result of the evaluation of the SCell conditions for the target SCells.

According to some embodiments of the present disclosure, the processor may be further configured to control the wireless device to apply a connection with at least one of the target SCells, based on that the at least one of the target SCells is evaluated to be satisfied the at least one of the SCell conditions for the target SCells.

According to some embodiments of the present disclosure, the processor may be further configured to control the wireless device to establish a connection with source SCells before receiving the handover command. For example, the handover command may include at least one of SCell conditions for the source SCells.

For example, the processor may be configured to control the wireless device to keep a connection with at least one of the source SCells, based on that the at least one of the source SCells is evaluated to be satisfied the at least one of the SCell conditions for the source SCells.

For other example, the processor may be configured to control the wireless device to release a connection with at least one of the source SCells, based on that the at least one of the source SCells is evaluated not to be satisfied the at least one of the SCell conditions for the source SCells.

According to some embodiments of the present disclosure, the handover complete message may include information on at least one of the target SCells, based on that the at least one of the target SCells is evaluated to be satisfied the at least one of the SCell conditions for the target SCells.

According to some embodiments of the present disclosure, the handover complete message may include information informing that none of the target SCells satisfies the at least one of the SCell conditions for the target SCells.

According to some embodiments of the present disclosure, the handover command may include at least one of PCell conditions for multiple target PCells and at least one of SCell conditions for multiple sets of target SCells. Each of the multiple sets of the target SCells is associated with each of the multiple target PCells.

In this case, the processor may be configured to control the wireless device to evaluate the at least one of the SCell conditions only for a specific set of the target SCells, upon determining that the at least one of the PCell conditions for a specific PCell is met. The specific set of the target SCells is associated with the specific target PCell.

According to some embodiments of the present disclosure, the processor may be configured to control the wireless device to perform handover to the target PCell based on that the PCell condition is met. The processor may be configured to control the wireless device to establish a carrier aggregation and/or a dual connectivity for the PCell with at least one of the target SCells based on that the at least one of the target SCells is evaluated to be satisfied the at least one of the SCell conditions for the target SCells.

Hereinafter, a non-transitory computer-readable medium which has stored thereon a plurality of instructions for managing SCells during a conditional PCell handover in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to establish a connection with a source Primary Cell (PCell). The stored a plurality of instructions may cause the wireless device to receive, from the source PCell, a handover command including a PCell condition for a target PCell. The handover command includes at least one of Secondary Cell (SCell) conditions for target SCells. The stored a plurality of instructions may cause the wireless device to evaluate the SCell conditions for the target SCells upon determining that the PCell condition for the target PCell is met. The stored a plurality of instructions may cause the wireless device to transmit, to the target PCell, a handover complete message including result of the evaluation of the SCell conditions for the target SCells.

According to some embodiments of the present disclosure, the stored a plurality of instructions may cause the wireless device to apply a connection with at least one of the target SCells, based on that the at least one of the target SCells is evaluated to be satisfied the at least one of the SCell conditions for the target SCells.

According to some embodiments of the present disclosure, the stored a plurality of instructions may cause the wireless device to establish a connection with source SCells before receiving the handover command. For example, the handover command may include at least one of SCell conditions for the source SCells.

For example, the stored a plurality of instructions may cause the wireless device to keep a connection with at least one of the source SCells, based on that the at least one of the source SCells is evaluated to be satisfied the at least one of the SCell conditions for the source SCells.

For other example, the stored a plurality of instructions may cause the wireless device to release a connection with at least one of the source SCells, based on that the at least one of the source SCells is evaluated not to be satisfied the at least one of the SCell conditions for the source SCells.

According to some embodiments of the present disclosure, the handover complete message may include information on at least one of the target SCells, based on that the at least one of the target SCells is evaluated to be satisfied the at least one of the SCell conditions for the target SCells.

According to some embodiments of the present disclosure, the handover complete message may include information informing that none of the target SCells satisfies the at least one of the SCell conditions for the target SCells.

According to some embodiments of the present disclosure, the handover command may include at least one of PCell conditions for multiple target PCells and at least one of SCell conditions for multiple sets of target SCells. Each of the multiple sets of the target SCells is associated with each of the multiple target PCells.

In this case, the stored a plurality of instructions may cause the wireless device to evaluate the at least one of the SCell conditions only for a specific set of the target SCells, upon determining that the at least one of the PCell conditions for a specific PCell is met. The specific set of the target SCells is associated with the specific target PCell. According to some embodiments of the present disclosure, the stored a plurality of instructions may cause the wireless device to perform handover to the target PCell based on that the PCell condition is met. The stored a plurality of instructions may cause the wireless device to establish a carrier aggregation and/or a dual connectivity for the PCell with at least one of the target SCells based on that the at least one of the target SCells is evaluated to be satisfied the at least one of the SCell conditions for the target SCells.

Hereinafter, a method, performed by a target base station (BS), for managing SCells during a conditional PCell handover in a wireless communication system, according to some embodiments of the present disclosure, will be described.

A target BS may receive, from a source BS, a handover preparation request for a wireless device. For example, the handover preparation request may include measurement results of the first measurement from the wireless device, which is connected to the source BS.

A target BS may transmit, to the source BS, a handover preparation response for the wireless device.

A target BS may receive, from the wireless device, a handover complete message including result of an evaluation of at least one of Secondary Cell (SCell) conditions for target SCells.

A target BS may apply a dual connectivity and/or a carrier aggregation with at least one of the target SCells based on the received result of the evaluation, based on that the at least one of the target SCells is evaluated to be satisfied the at least one of the SCell conditions for the target SCells.

Hereinafter, a target base station (BS) for managing SCells during a conditional PCell handover in a wireless communication system, will be described. The detailed description overlapping with the above-described contents will be simplified or omitted.

A target BS may include a processor, a memory, and a transceiver. For example, the processor may be configured to be coupled operably with the memory and the transceiver.

The processor may be configured to control the transceiver to receive, from a source BS, a handover preparation request for a wireless device.

The processor may be configured to control the transceiver to transmit, to the source BS, a handover preparation response for the wireless device.

The processor may be configured to control the transceiver to receive, from the wireless device, a handover complete message including result of an evaluation of at least one of Secondary Cell (SCell) conditions for target SCells.

The processor may be configured to apply a dual connectivity and/or a carrier aggregation with at least one of the target SCells based on the received result of the evaluation, based on that the at least one of the target SCells is evaluated to be satisfied the at least one of the SCell conditions for the target SCells.

The present disclosure can have various advantageous effects.

According to some embodiments of the present disclosure, a wireless device could manage SCell configuration in a conditional handover procedure, efficiently.

For example, a wireless device may report, to the target BS, valid SCells for CA and/or DC operation.

For example, CA and/or DC operation could be started with reported SCells as soon as the target BS receives the handover complete message.

For example, a wireless device may use the SCell configuration included in a conditional handover command, when a condition for the conditional handover is met.

For example, a wireless device may start to establish a SCell addition for CA and/or DC without receiving additional SCell configurations.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
 establishing a connection with a source Primary Cell (PCell);
 establishing one or more connections with one or more source SCells before receiving a first message including information related to a handover command;

receiving, from the source PCell, the first message including the information related to the handover command,
wherein the first message includes (i) information related to a PCell condition for a target PCell, (ii) information related to one or more Secondary Cell (SCell) conditions for one or more target SCells, and (iii) information related to one or more SCell conditions for the one or more source SCells;
evaluating the one or more SCell conditions for the one or more target SCells upon determining that the PCell condition for the target PCell is satisfied; and
transmitting, to the target PCell, a second message including (i) information related to a handover complete and (ii) information related to evaluation results for the one or more SCell conditions for the one or more target SCells.

2. The method of claim 1, wherein the method further comprises,
establishing a connection with at least one target SCell among the one or more target SCells, based on the at least one target SCell satisfying an SCell condition for the at least one target SCell.

3. The method of claim 1, wherein method further comprises,
keeping at least one connection with at least one source SCell among the one or more source SCells, based on the at least one source SCell satisfying at least one SCell condition for the at least one source SCell.

4. The method of claim 1, wherein method further comprises,
releasing at least one connection with at least one source SCell among the one or more source SCells, based on that the at least one source SCell satisfying at least one SCell condition for the at least one source SCell.

5. The method of claim 1, wherein the second message includes information related to at least one target SCell among the one or more target SCells, based on the at least one target SCell satisfying at least one SCell condition for the at least one target SCell.

6. The method of claim 1, wherein the second message includes information informing that none of the one or more target SCells satisfies the one or more SCell conditions for the one or more target SCells.

7. The method of claim 1, wherein the first message includes (i) information related to one or more PCell conditions for multiple target PCells and (ii) information related to one or more SCell conditions for multiple sets of target SCells, and
wherein each of the multiple sets of the target SCells is associated with each of the multiple target PCells.

8. The method of claim 7,
wherein the evaluating the one or more SCell conditions for the one or more target SCells further comprises,
evaluating the one or more SCell conditions only for a specific set of the target SCells, upon determining that the one or more PCell conditions for a specific PCell is met,
wherein the specific set of the target SCells is associated with the specific target PCell.

9. The method of claim 1, wherein the method further comprises,
performing handover to the target PCell based on the PCell condition being met; and
establishing a carrier aggregation and/or a dual connectivity for the PCell with at least one SCell among the one or more target SCells, based on the at least one SCell satisfying the one or more SCell conditions for the target SCells.

10. The method of claim 1, wherein the wireless device is in communication with at least one of a user equipment, a network, or an autonomous vehicle other than the wireless device.

11. A wireless device in a wireless communication system comprising:
a transceiver;
a memory; and
at least one processor operatively coupled to the transceiver and the memory, and configured to:
establish a connection with a source Primary Cell (PCell);
establish one or more connections with one or more source SCells before receiving a first message including information related to a handover command;
receive, from the source PCell, the first message including the information related to the handover command,
wherein the first message includes (i) information related to a PCell condition for a target PCell, (ii) information related to one or more Secondary Cell (SCell) conditions for one or more target SCells, and (iii) information related to one or more SCell conditions for the one or more source SCells;
evaluate the one or more SCell conditions for the one or more target SCells upon determining that the PCell condition for the target PCell is satisfied; and
transmit, to the target PCell, a second message including (i) information related to a handover complete and (ii) information related to evaluation results for the one or more SCell conditions for the one or more target SCells.

12. The wireless device of claim 11, wherein the at least one processor is further configured to,
establish a connection with at least one of the target SCells among the one or more target SCells, based on the at least one target SCell satisfying an SCell condition for the at least one target SCell.

13. The wireless device of claim 11, wherein the at least one processor is further configured to,
keep at least one connection with at least one SCell among the one or more source SCells, based on the at least one source SCell satisfying at least one SCell condition for the at least one source SCell.

14. The wireless device of claim 11, wherein the at least one processor is further configured to,
release at least one connection with at least one source SCell among the one or more source SCells, based on that the at least one source SCell satisfying at least one SCell condition for the at least one source SCell.

15. The wireless device of claim 11, wherein the second message includes information related to at least one target SCell among the one or more target SCells, based on the at least one target SCell satisfying at least one SCell condition for the at least one target SCell.

16. The wireless device of claim 11, wherein the second message includes information informing that none of the one or more target SCells satisfies the one or more SCell conditions for the one or more target SCells.

17. The wireless device of claim 11,
wherein the first message includes (i) information related to one or more PCell conditions for multiple target PCells and (ii) information related to one or more SCell conditions for multiple sets of target SCells, and
wherein each set of the multiple sets of the target SCells is associated with each of the multiple target PCells.

18. A non-transitory computer-readable medium having stored thereon a plurality of instructions, which, when executed by a processor of a wireless device, cause the wireless device to:
- establish a connection with a source Primary Cell (PCell);
- establish one or more connections with one or more source SCells before receiving a first message including information related to a handover command;
- receive, from the source PCell, the first message including the information related to the handover command,
- wherein the first message includes (i) information related to a PCell condition for a target PCell, (ii) information related to one or more Secondary Cell (SCell) conditions for one or more target SCells, and (iii) information related to one or more SCell conditions for the one or more source SCells;
- evaluate the one or more SCell conditions for the one or more target SCells upon determining that the PCell condition for the target PCell is satisfied; and
- transmit, to the target PCell, a second message including (i) information related to a handover complete and (ii) information related to evaluation results for the one or more SCell conditions for the one or more target SCells.

* * * * *